(12) United States Patent
Netherland, III et al.

(10) Patent No.: US 8,485,586 B2
(45) Date of Patent: Jul. 16, 2013

(54) BACK-UP POWER FOR CONTROLLING AN ACCESS OPENING IN A BODY OF A VEHICLE

(75) Inventors: James S. Netherland, III, Clarkston, MI (US); Scott P. Charnesky, Birmingham, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/213,146

(22) Filed: Aug. 19, 2011

(65) Prior Publication Data

US 2013/0042533 A1 Feb. 21, 2013

(51) Int. Cl.
*B60J 5/04* (2006.01)

(52) U.S. Cl.
USPC ..................................... 296/146.4

(58) Field of Classification Search
USPC ............... 296/146.4, 146.11, 202; 49/358, 49/506; 292/300
See application file for complete search history.

(56) References Cited

U.S. PATENT DOCUMENTS

| | | | |
|---|---|---|---|
| 3,398,484 A * | 8/1968 | Katsumura et al. | 49/138 |
| 5,982,126 A * | 11/1999 | Hellinga et al. | 318/468 |
| 7,059,654 B2 * | 6/2006 | Ichinose | 296/146.1 |
| 7,458,621 B2 * | 12/2008 | Fujihara et al. | 292/216 |
| 7,784,841 B2 * | 8/2010 | Watson et al. | 292/336.3 |
| 8,123,278 B1 * | 2/2012 | Mckenney et al. | 296/146.9 |
| 8,267,464 B2 * | 9/2012 | Konchan et al. | 296/146.6 |
| 2007/0018790 A1 * | 1/2007 | LaFrance | 340/5.72 |
| 2008/0224482 A1 * | 9/2008 | Cumbo et al. | 292/216 |
| 2010/0007463 A1 * | 1/2010 | Dingman et al. | 340/5.72 |
| 2011/0203336 A1 * | 8/2011 | Mette et al. | 70/277 |
| 2011/0204675 A1 * | 8/2011 | Sonnek et al. | 296/146.4 |
| 2012/0133175 A1 * | 5/2012 | Charnesky et al. | 296/146.4 |
| 2012/0153678 A1 * | 6/2012 | Konchan et al. | 296/202 |
| 2012/0174489 A1 * | 7/2012 | Sonnek et al. | 49/460 |
| 2012/0175893 A1 * | 7/2012 | Sonnek et al. | 292/143 |

* cited by examiner

*Primary Examiner* — H Gutman
(74) *Attorney, Agent, or Firm* — Quinn Law Group, PLLC

(57) ABSTRACT

A system for controlling an access opening in a vehicle body includes first and second doors arranged to selectively open and close first and second portions of the opening. The system also includes a power-activated device operatively connected to the first door and configured to be selectively retracted before at least one of the first and second doors is opened. The power-activated device is also configured to be protracted when the first and second doors are closed to thereby seal the first and second portions of the access opening. The system additionally includes a primary energy storage device configured to supply power to the power-activated device. Furthermore, the system includes an auxiliary energy storage device configured to supply back-up power to the power-activated device when the power supplied by the primary energy storage device is interrupted.

20 Claims, 3 Drawing Sheets

BACK-UP POWER FOR CONTROLLING AN ACCESS OPENING IN A BODY OF A VEHICLE

TECHNICAL FIELD

The disclosure relates to a system having back-up power for controlling an access opening in a body of a vehicle.

BACKGROUND

A typical vehicle has at least one access door. Such a door typically has a latch mechanism for maintaining the door in a latched or closed state until access into or egress from the vehicle is required. The latch mechanism is typically actuated by an outside door handle to gain access to the interior of the vehicle.

Some vehicles employ multiple side doors for access to the vehicle's interior. Commonly, when viewed from the front of the vehicle, such side doors are hinged proximate their front edge. Vehicles with multiple front-hinged side access doors typically employ a structural pillar, often called a B-pillar, on each side of the vehicle.

There are also vehicles that have multiple side doors, but do not employ a structural pillar between the doors. Instead, such pillar-less vehicles have a largely open space that is selectively covered and uncovered by the access doors. Any gaps remaining between closed access doors may be sealed by supplementary devices whose operation may be controlled manually or be power assisted.

SUMMARY

A system for controlling an access opening in a vehicle body includes first and second doors arranged to selectively open and close first and second portions of the opening. The system also includes a power-activated device operatively connected to the first door and configured to be selectively retracted before at least one of the first and second doors is opened. The power-activated device is also configured to be protracted when the first and second doors are closed to thereby seal the first and second portions of the access opening. The system additionally includes a primary energy storage device configured to supply power to the power-activated device. Furthermore, the system includes an auxiliary energy storage device configured to supply back-up power to the power-activated device when the power supplied by the primary energy storage device is interrupted.

The power-activated device may be configured to remain protracted when the first door is maintained closed and the second door is selectively opened and closed.

The power-activated device may also be configured to retract fully to clear the second door when the first door is selectively opened and closed and to retract at least partially to clear the second door when the second door is selectively opened and closed.

The vehicle body may be characterized by a front end, a rear end, and an absence of a B-pillar. In such a case, the opening may be an entryway on a side of the vehicle, the first portion of the opening may be positioned toward the rear end of the vehicle, and the second portion of the opening may be positioned toward the front end of the vehicle. Additionally, the first door may be rear-hinged and the second door may be front-hinged.

The system may also include a detent operatively connected to the power-activated device. The detent may be configured to latch the power-activated device to the first door when the device is protracted and release the power-activated device from the first door before the device is retracted.

The system may additionally include an actuator operatively connected to each of the primary and auxiliary energy storage devices and configured to selectively retract and protract the power-activated device.

The system may additionally include a first release mechanism and a second release mechanism operatively connected to the first door, as well as a third release mechanism and a fourth release mechanism operatively connected to the second door. In such a case, the operation of at least one of the first, second, third and fourth release mechanisms may trigger the actuator to retract the power-activated device.

The auxiliary energy storage device may be sufficiently compact to be arranged on the first door.

A vehicle employing the above-described system is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
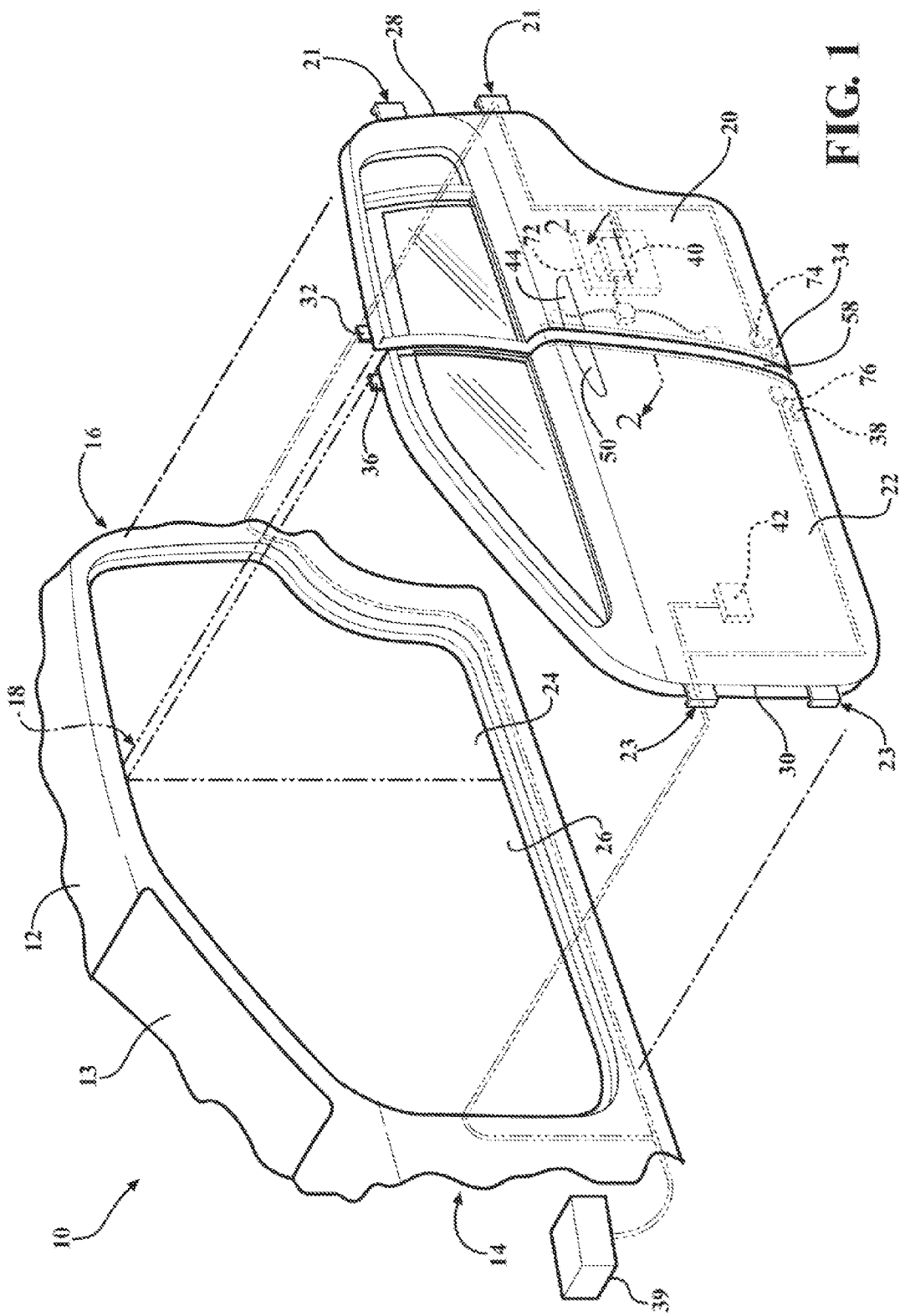
FIG. 1 is a schematic perspective exploded view of a vehicle body illustrating a front-hinged side door and a rear-hinged side door according to an embodiment, with both doors shown in a closed state, along with a primary energy storage device and an auxiliary energy storage device configured to supply back-up power.

Referring to the drawings, wherein like reference numbers refer to like components, FIG. 1 shows a vehicle 10. The vehicle 10 includes a vehicle body 12, as well as openings for windows and various access doors. The body 12 encloses an interior space that is adapted to accommodate vehicle passengers and their belongings. The body 12 includes a front end 14 and a rear end 16 of the vehicle and an access opening 18. The vehicle 10 also includes a system 13 for controlling or selectively opening and closing the access opening 18.

The opening 18 is adapted to provide access into the vehicle passenger compartment, i.e., is an entryway arranged on a side of the vehicle. The system 13 includes two panels, a first side door 20 and a second side door 22, that are configured to cover the opening 18. The first and second side doors 20, 22 are "independently" openable and closable, i.e., each of the first and second doors can be opened or closed regardless of the position of the other vehicle door. Although two side doors 20, 22 are shown, a body 12 adapted to employ fewer or greater number of doors is also envisioned. The opening 18 is characterized by an absence of a B-pillar, and is thus termed "continuous".

A B-pillar is a structural component that is often employed in bodies of vehicles, and is typically used for mounting miscellaneous door and body hardware, such as door hinges and wiring, and to enhance the structure of the vehicle body. Generally, whether the vehicle employs a B-pillar or not depends on the packaging and the intended use of the vehicle. The presence of a B-pillar, although useful for providing a structural benefit, may restrict entry into the vehicle. Thus, an absence of a B-pillar is not unusual in vehicles that employ a tightly packaged passenger compartment along with reduced width side doors, such as compact vehicles, and may also be encountered in work vehicles, such as trucks.

The first side door 20 is arranged to selectively open and close a first portion 24 of the opening 18, and second side door 22 is arranged to selectively open and close a second portion 26 of the opening 18. As configured, the second portion 26 of the opening 18 is a portion of the access opening that may remain uncovered or open when the first portion 24 is covered by the first door 20. The first portion 24 is positioned toward the rear end 16 of the body 12, and the second portion 26 is positioned toward the front end 14 of the body. The first door 20 is pivotably attached to the body 12 via hinges 21 at its rear or trailing edge 28, while the second door 22 is pivotably attached to the body 12 via hinges 23 at its front or leading edge 30. The first door 20 is termed as being rear-hinged, while the second door 22 is termed as being front-hinged. When opened, the first door 20 swings toward the rear end 16 of the body 12, while the second door 22 swings toward the front end 14, and are, thus, arranged as opposite swinging doors.

The system 13 additionally includes two sets of latches, a first set of latches 32 and 34, and a second set of latches 36 and 38. The latches 32 and 34 are mounted on the first door 20, and the latches 36 and 38 are mounted on the second door 22. The latches 32 and 34 are arranged to selectively latch the first door 20 to the body 10 when the first door is closed, and release the first door to open the first portion 24 of the opening 18. Similarly, the latches 36 and 38 are arranged to selectively latch the second door 22 to the body 10 when the second door is closed, and release the second door to open the second portion 26 of the opening 18. An electric motor 40 is mounted on the first door 20, while an electric motor 42 is mounted on the second door 22. The first set of latches 32 and 34 is releasable on demand by the electric motor 40, while the second set of latches 36 and 38 is releasable on demand by the electric motor 42.

The motor 40 is operated via a command received either from a first release mechanism 44, such as a lever or a button located on an exterior surface 46 of the first door 20, or via a second release mechanism (not shown) located on an interior surface 48 of the first door. Similarly, the motor 42 is operated via a command received either from a third release mechanism 50, such as a lever or a button located on an exterior surface 52 of the second door 22, or via a fourth release mechanism (not shown) located on an interior surface 54 of the second door.

The system 13 also includes a primary energy storage device 39, such as a battery. The primary energy storage device 39 is configured as the main source of electrical power for operating various systems in the vehicle 10, including the vehicle's powertrain and accessories, such as a heating, ventilation, and air conditioning system (not shown). The motors 40 and 42 are each electrically connected to and receive power from the primary energy storage device 39. The operation of the motors 40 and 42 may be regulated by a controller 72 arranged on the vehicle body 12.

Figure 2:
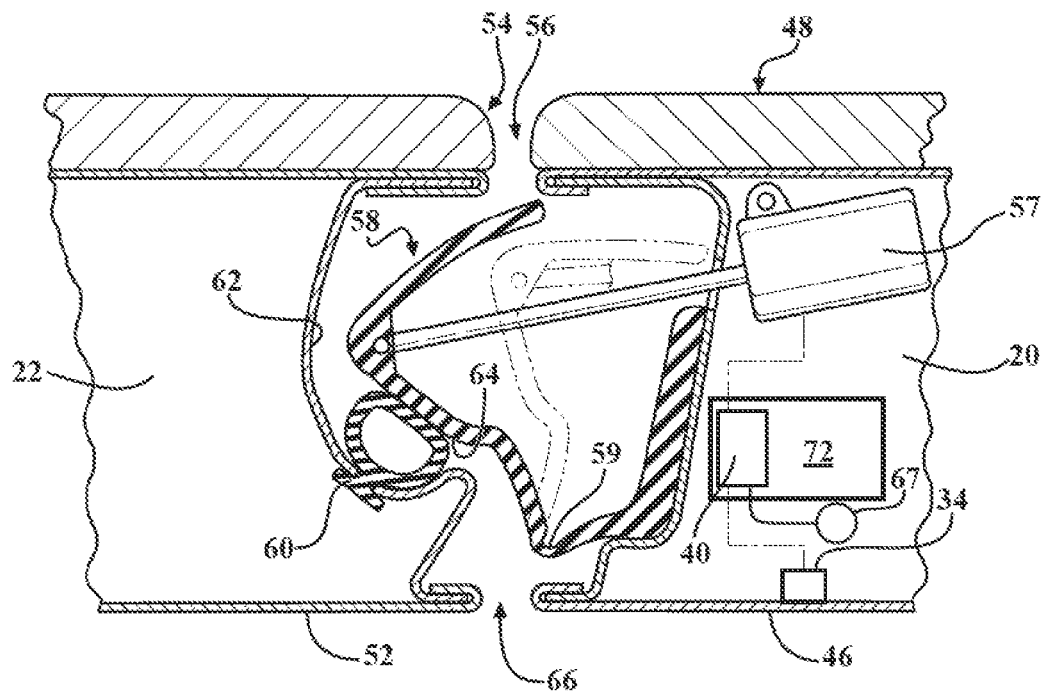
FIG. 2 is a schematic sectional top view of a portion of the side doors taken at line 2-2 of FIG. 1, depicting the side doors in a closed state and a power-activated device in a protracted state for sealing the doors.
Figure 3:
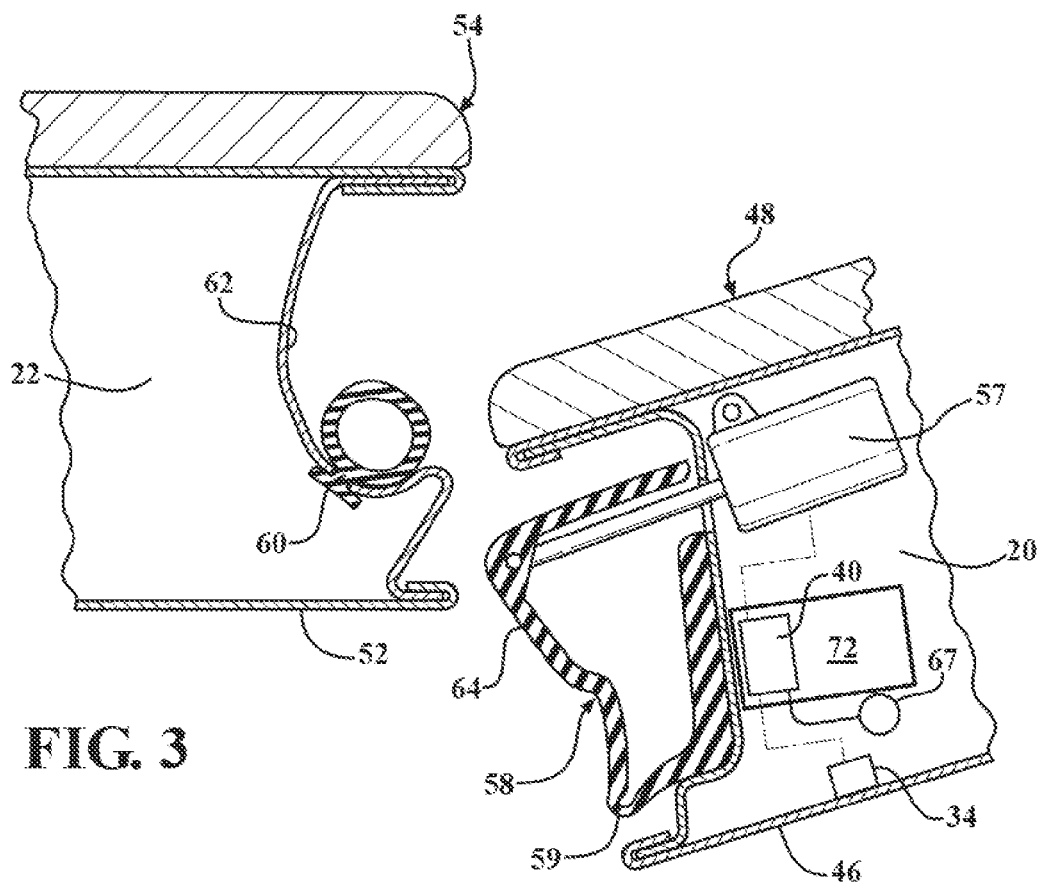
FIG. 3 is a schematic sectional top view of a portion of the side doors shown in FIG. 1, depicting the rear-hinged door in an open state and the front-hinged door in a closed state, and the power-activated device in a retracted state.
Figure 4:
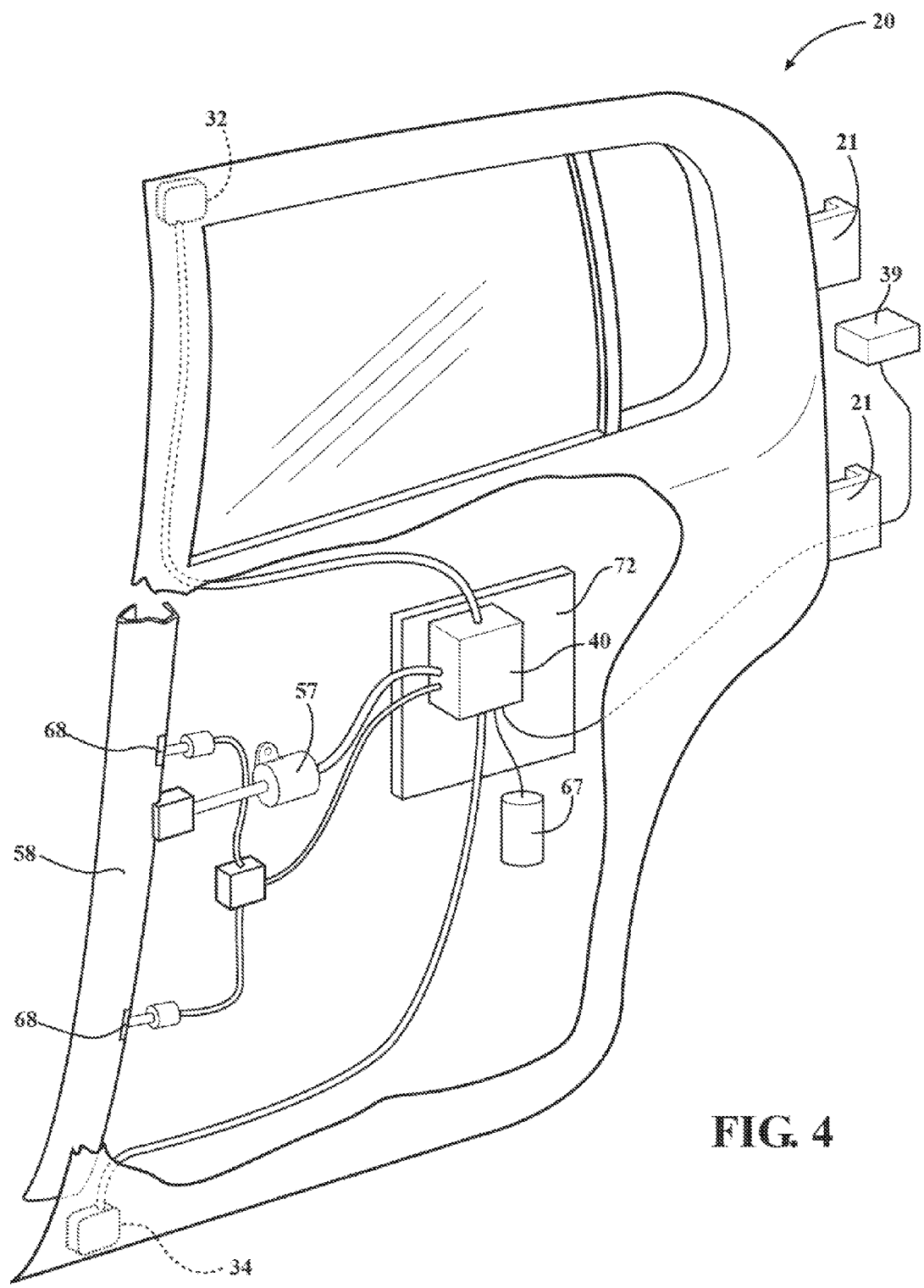
FIG. 4 is a schematic partial cut-away view of the rear-hinged side door shown in FIG. 1, the rear-hinged side door employing the power-activated device and housing the auxiliary energy storage device.

When the doors 20 and 22 are closed, an opening 56 remains there between, as shown in FIG. 2. FIGS. 2-3 show a top view of the vehicle body 12, as seen along cross-section 2-2 depicted in FIG. 1. As shown in each of FIGS. 1-3, the system 13 also includes a power-activated device 58 operatively connected to the first door 20 and configured to be selectively retracted before at least one of the first and second doors 20, 22 is opened. The device 58 is also configured to be protracted when the first and second doors 20, 22 are closed to thereby seal the first and second portions 24, 26 of the access opening 18. The articulation of the device 58 is illustrated in FIGS. 2-3, wherein FIG. 2 depicts the first and second doors 20, 22 in a closed state, while FIG. 3 depicts the first door 20 in the process of being opened while the second door remains closed. FIG. 4 depicts the second door 20 in the process of being opened while the first door 20 remains closed. When the device 58 is protracted, i.e., when both first and second doors 20, 22 are closed, the device covers or fills the opening 56.

The protraction and retraction of the device 58 is accomplished via an actuator 57, which may be an electromechanical device, such as a solenoid. The actuator 57 may also be a mechanism that is set in motion by an electric motor, for example the motor 40 (as shown in FIGS. 2-4). The operation of at least one of the first and third release mechanisms 44, 50 or one of the second and fourth release mechanisms may trigger the actuator 57 to retract the device 58. As shown in FIGS. 2-3, the second door 22 includes a compliant sealing member 60 adapted to be compressed by the device 58 and seal the opening 18 shown in FIG. 1 when the first door 20 and the second door 22 are closed. In the alternative, the sealing member 60 may be operatively connected to the device 58 (not shown), and thus be articulated therewith. The sealing member 60 is a weather strip that is mounted to a side surface 62 of the second door 22.

As shown in FIGS. 2-3, the device 58 includes a surface 64. The surface 64 is adapted to engage and compress the sealing member 60 for seamless contact therewith when the first and second doors 20, 22 are closed. As shown in FIG. 2, when both the first and the second doors 20, 22 are closed, the first and second doors substantially cover the device 58, leaving but a narrow gap 66 between the exterior surfaces 46 and 52. Thus, with the aid of the sealing member 60, when the device 58 is in its protracted position, the device blocks the passage from the gap 66 to the interior surfaces 48, 54. In the event that the sealing member 60 is operatively connected to the device 58, by protracting the device the sealing member may be compressed against the edges of both the first and second doors 20, 22 proximately to the exterior surfaces 46, 52, thus filling the gap 66. The device 58 also fills the opening 56 to protect the interior space of the vehicle 10 from external moisture and dust.

The device 58 includes at least one hinge 59 that is configured to permit the device to be articulated, i.e., protracted or retracted, as necessary. The device 58 may be configured to retract fully to clear the second door 22 when the first door 20 is selectively opened and closed, and be configured to retract at least partially to clear the second door when the second door is selectively opened and closed. As may be seen from FIGS. 2 and 4, it may be sufficient for the device 58 to retract only partially when the second door 22 is either opened or closed because the interior surface 54 of the second door begins to move away from the device shortly after the second door begins to swing. On the other hand, as may be seen from FIGS. 2 and 3, it may be insufficient for the device 58 to retract only partially when the first door 20 is either opened or closed because the device continues to move toward the exterior surface 52 of the second door during an extended part of its trajectory after the first door begins to swing. Accordingly, full retraction of the device 58 may be required for clearing the second door 22 when the first door 20 is being operated. Also, a construction of the system 13 is envisioned where the device 58 may remain protracted when the first door 20 is maintained closed and the second door 22 is selectively opened and closed.

The system 13 additionally includes an auxiliary energy storage device 67, such as a back-up battery. The auxiliary energy storage device 67 is configured to supply back-up power to the device 58. The auxiliary energy storage device 67 is used to operate the actuator 57 when the power supplied by the primary energy storage device 39 is interrupted. Accordingly, the actuator is operatively connected to each of the primary and auxiliary energy storage devices 39 and 67. The power supplied by the primary energy storage device 39 may be effectively interrupted if the primary energy storage device runs low on electrical charge, or if the physical connection between the primary energy storage device and the device 58 is severed.

Because the auxiliary energy storage device 67 is only employed to provide back-up power to the device 58, the auxiliary energy storage device may be physically more compact than the primary energy storage device 39. In fact, the auxiliary energy storage device 67 may be sufficiently compact to be arranged on the first door 20, as shown in FIGS. 1-4. Accordingly, in addition to being connected to receive power from the primary energy storage device 39, the actuator 57 is electrically connected to the auxiliary energy storage device 67 for receiving back-up power therefrom. As a result, full retraction of the device 58 may be instituted every time the second door 22 is opened, because even in the event of loss of power from the primary energy storage device 39 the device 58 still retains back-up power from the auxiliary energy storage device 67. As an added benefit, size of the opening 56 may be reduced for the case where the device 58 is retracted every time the second door 22 is opened, as compared with the case where the protracted device 58 must be cleared by the second door 22. Additionally, full retraction of the device 58 every time the second door 22 is opened affords more convenient ingress and egress for vehicle occupants by increasing the size of the second portion 26 of the opening 18 when the first door 20 is closed.

As shown in FIG. 4, detents 68 may be mounted on the device 58 and be configured to latch or lock the device in the protracted position to the first door 20. The detents 68 are arranged to latch the device 58 to the first door 20 when the device is protracted and are operable to release the device from the first door before the device is retracted. Although two detents 68 are shown in FIG. 4, any number of detents may be used to securely latch the device 58 to the first door 20. As shown, the electric motor 40 may be operatively connected to the detents 68 for releasing the device 58 from the first door 20 in addition to being employed for operating the actuator 57 to selectively protract and retract the device 58. In such a case, the motor 40 is electrically connected to the primary energy storage device 39, as well as to the auxiliary energy storage device 67 for receiving back-up power therefrom.

The operation of the device 58 may be regulated by a controller 72 arranged on the body 12 (shown in FIGS. 1-4). Accordingly, the controller 72 may be programmed to assess whether the power supplied from the primary energy storage device 39 to the actuator 57 was interrupted, and regulate the auxiliary energy storage device 67 to supply back-up power to the actuator for operating the device 58 when primary power is unavailable. Additionally, continuous detection of whether each of the first and second doors 20, 22 is open or closed may be implemented to facilitate the retraction and protraction of the device 58, as well as the releasing of the first set of latches 32 and 34, the second set of latches 36 and 38, and detents 68 at appropriate instances.

In furtherance of such an objective, a sensor 74 may be employed to detect the position of the first door 20, while a sensor 76 may be employed to detect the position of the second door 22, as shown in FIG. 1. The sensors 74 and 76 may be configured to communicate the detected position of the first and second doors 20, 22, respectively, to the controller 72 for appropriate control of the motor 40. The sensors 74 and 76 may have any appropriate configuration to affect the required detection of the position of the first and second doors 20, 22, such as electro-mechanical switches or optical proximity sensors. Additionally, the sensor 74 may be incorporated into the latch 34, while the sensor 76 may be incorporated into the latch 38.

As shown in FIG. 4, the device 58 may be mounted on the first door 20. Although not specifically shown, the device 58 may similarly be mounted on the second door 22. In such a case, the auxiliary energy storage device 67 may correspondingly be arranged on the second door 22. The device 58 along with the auxiliary energy storage device 67 may also be employed to seal two opposite swinging doors on a rear end of a vehicle, as occasionally used for access to storage compartments in vans, station wagons, and sport utility vehicles (SUVs).

While the best modes for carrying out the invention have been described in detail, those familiar with the art to which this invention relates will recognize various alternative designs and embodiments for practicing the invention within the scope of the appended claims.

The invention claimed is:

1. A system for controlling an access opening in a body of a vehicle, the system comprising:
    a first door arranged to selectively open and close a first portion of the access opening;
    a second door arranged to selectively open and close a second portion of the access opening;
    a compliant sealing member configured to seal the first and second portions of the access opening;
    a power-activated device operatively connected to the first door and configured to be selectively retracted before at least one of the first and second doors is opened and protracted when the first and second doors are closed such that the sealing member is compressed by the device to seal the first and second portions of the access opening;
    a primary energy storage device configured to supply power to the power-activated device; and
    an auxiliary energy storage device configured to supply back-up power to the power-activated device when the power supplied by the primary energy storage device is interrupted.

2. The system of claim 1, wherein the power-activated device is configured to remain protracted when the first door is maintained closed and the second door is selectively opened and closed.

3. The system of claim 1, wherein the power-activated device is configured to retract fully to clear the second door when the first door is selectively opened and closed and to retract at least partially to clear the second door when the second door is selectively opened and closed.

4. The system of claim 1, wherein the body is characterized by a front end, a rear end, and an absence of a B-pillar, and wherein:

the opening is an entryway on a side of the vehicle;
the first portion of the opening is positioned toward the rear end of the vehicle and the second portion of the opening is positioned toward the front end of the vehicle;
the first door is rear-hinged; and
the second door is front-hinged.

5. The system of claim 1, further comprising a detent operatively connected to the power-activated device and configured to latch the power-activated device to the first door when the device is protracted and release the power-activated device from the first door before the device is retracted.

6. The system of claim 1, further comprising an actuator operatively connected to each of the primary and auxiliary energy storage devices and configured to selectively retract and protract the power-activated device.

7. The system of claim 6, further comprising:
a first release mechanism and a second release mechanism operatively connected to the first door; and
a third release mechanism and a fourth release mechanism operatively connected to the second door;
wherein the operation of at least one of the first, second, third and fourth release mechanisms triggers the actuator to retract the power-activated device.

8. The system of claim 1, wherein the auxiliary energy storage device is arranged on the first door.

9. A vehicle comprising:
a vehicle body having a front end and a rear end, and defining an access opening; and
a system for sealing the access opening, the system having:
a first door arranged to selectively open and close a first portion of the access opening;
a second door arranged to selectively open and close a second portion of the access opening;
a compliant sealing member configured to seal the first and second portions of the access
a power-activated device operatively connected to the first door and configured to be selectively retracted before at least one of the first and second doors is opened and protracted when the first and second doors are closed such that the sealing member is compressed by the device to seal the first and second portions of the access opening;
a primary energy storage device configured to supply power to the power-activated device; and
an auxiliary energy storage device configured to supply back-up power to the power-activated device when the power supplied by the primary energy storage device is interrupted.

10. The vehicle of claim 9, wherein the power-activated device is configured to remain protracted when the first door is maintained closed and the second door is selectively opened and closed.

11. The vehicle of claim 9, wherein the power-activated device is configured to retract fully to clear the second door when the first door is selectively opened and closed and to retract at least partially to clear the second door when the second door is selectively opened and closed.

12. The vehicle of claim 9, wherein the body is characterized by an absence of a B-pillar, and wherein:
the opening is an entryway on a side of the vehicle;
the first portion of the opening is positioned toward the rear end of the vehicle and the second portion of the opening is positioned toward the front end of the vehicle;
the first door is rear-hinged; and
the second door is front-hinged.

13. The vehicle of claim 9, further comprising a detent operatively connected to the power-activated device and configured to latch the power-activated device to the first door when the device is protracted and release the power-activated device from the first door before the device is retracted.

14. The vehicle of claim 9, further comprising an actuator operatively connected to each of the primary and auxiliary energy storage devices and configured to selectively retract and protract the power-activated device.

15. The vehicle of claim 14, further comprising:
a first release mechanism and a second release mechanism operatively connected to the first door; and
a third release mechanism and a fourth release mechanism operatively connected to the second door;
wherein the operation of at least one of the first, second, third and fourth release mechanisms triggers the actuator to retract the power-activated device.

16. The vehicle of claim 9, wherein the auxiliary energy storage device is arranged on the first door.

17. A vehicle comprising:
a body having a front end and a rear end, characterized by an absence of a B-pillar, and defining an access opening on a side of the vehicle; and
a system for sealing the access opening, the system having:
a first door arranged to selectively open and close a first portion of the access opening, wherein the first door is rear-hinged and the first portion of the opening is positioned toward the rear end of the vehicle;
a second door arranged to selectively open and close a second portion of the access opening, wherein the second door is front-hinged and the second portion of the opening is positioned toward the front end of the vehicle;
a compliant sealing member configured to seal the first and second portions of the access opening;
a power-activated device operatively connected to the first door and configured to be selectively retracted before at least one of the first and second doors is opened and protracted when the first and second doors are closed such that the sealing member is compressed by the device to seal the first and second portions of the access opening;
a primary energy storage device configured to supply power to the power-activated device; and
an auxiliary energy storage device configured to supply back-up power to the power-activated device when the power supplied by the primary energy storage device is interrupted;
a detent operatively connected to the power-activated device and configured to latch the power-activated device to the first door when the device is protracted and release the power-activated device from the first door before the device is retracted; and
an actuator operatively connected to each of the primary and auxiliary energy storage devices and configured to selectively retract and protract the power-activated device.

18. The vehicle of claim 17, wherein the power-activated device is configured to remain protracted when the first door is maintained closed and the second door is selectively opened and closed.

19. The vehicle of claim 17, wherein the power-activated device is configured to retract fully to clear the second door when the first door is selectively opened and closed and to retract at least partially to clear the second door when the second door is selectively opened and closed.

20. The vehicle of claim 17, further comprising:
a first release mechanism and a second release mechanism operatively connected to the first door; and a third release mechanism and a fourth release mechanism operatively connected to the second door;

wherein the operation of at least one of the first, second, third and fourth release mechanisms triggers the actuator to retract the power-activated device.

* * * * *